(12) United States Patent
Zhang et al.

(10) Patent No.: US 10,998,807 B2
(45) Date of Patent: May 4, 2021

(54) LINEAR VIBRATION MOTOR

(71) Applicant: AAC Acoustic Technologies (Shenzhen) Co., Ltd., Shenzhen (CN)

(72) Inventors: Tao Zhang, Shenzhen (CN); Jinquan Huang, Shenzhen (CN)

(73) Assignee: AAC ACOUSTIC TECHNOLOGIES (SHENZHEN) CO., LTD., Shenzhen (CN)

(*) Notice: Subject to any disclaimer, the term of this patent is extended or adjusted under 35 U.S.C. 154(b) by 2 days.

(21) Appl. No.: 16/526,959

(22) Filed: Jul. 30, 2019

(65) Prior Publication Data
US 2020/0044529 A1 Feb. 6, 2020

(30) Foreign Application Priority Data
Aug. 3, 2018 (CN) .......................... 201821255354.0

(51) Int. Cl.
*H02K 33/10* (2006.01)
(52) U.S. Cl.
CPC .................................... *H02K 33/10* (2013.01)
(58) Field of Classification Search
CPC ............................... H02K 33/10; H02K 33/16
See application file for complete search history.

(56) References Cited

U.S. PATENT DOCUMENTS

2003/0227225 A1* 12/2003 Kaneda .................. B06B 1/045
310/81
2010/0102646 A1* 4/2010 Masami ................. H02K 33/16
310/29
2011/0193426 A1* 8/2011 Chung ................... H02K 33/16
310/25

(Continued)

FOREIGN PATENT DOCUMENTS

JP     2009232558 A1    10/2009
JP     2010063263 A1     3/2010

(Continued)

OTHER PUBLICATIONS

1st Office Action dated Aug. 27, 2019 by JPO in related Japanese Patent Application No. 2019-133207(16 Pages).

(Continued)

*Primary Examiner* — Naishadh N Desai
(74) *Attorney, Agent, or Firm* — W&G Law Group LLP

(57) ABSTRACT

The present disclosure provides a linear vibration motor, including: a base having an accommodating space, a vibration system accommodated in the accommodating space, an elastic member configured to fix and suspend the vibration system in the accommodating space, and a drive system fixed on the base. The vibration system includes an annular magnetic steel unit fixed on the elastic member. The drive system includes a first coil and a second coil that are fixed on the base and stacked together. The magnetic steel unit surrounds both the first coil and the second coil and is disposed separately from the first coil and second coil. An orthogonal projection of the magnetic steel unit in a direction towards the drive system at least partially falls in the first coil and the second coil, respectively. Compared with related technologies, the linear vibration motor of the present disclosure has better vibration performance.

11 Claims, 4 Drawing Sheets

(56) References Cited

U.S. PATENT DOCUMENTS

2014/0232211 A1* 8/2014 Katada .................. H02K 33/00
310/25

FOREIGN PATENT DOCUMENTS

| JP | 2011055701 A1 | 3/2011 |
| JP | 2011189337 A1 | 9/2011 |
| JP | 2016036254 A1 | 3/2016 |

OTHER PUBLICATIONS

2nd Office Action dated Dec. 18, 2019 by JPO in related Japanese Patent Application No. 2019-133207(11 Pages).

* cited by examiner

LINEAR VIBRATION MOTOR

TECHNICAL FIELD

The present disclosure relates to a motor, and in particular, to a linear vibration motor applied to the field of mobile electronic products.

BACKGROUND

With the development of electronic technology, portable consumer electronic products such as mobile phones, handheld game consoles, navigation apparatuses or handheld multimedia entertainment devices become increasingly popular among people. Linear vibration motors are usually used in these electronic products to provide system feedbacks such as call alerts, message alerts, and navigation alerts of mobile phones and vibration feedbacks of game consoles. Such wide application causes vibration motors to have high performance and long service life.

A linear vibration motor in related technologies includes a base having an accommodating space, a vibration system located in the accommodating space, an elastic member configured to fix and suspend the vibration system in the accommodating space, and a coil fixed on the base. Electromagnetic fields generated by the coil and the vibration system interact to drive the vibration system to make a reciprocal linear movement to generate vibration.

However, in a structure in which the linear vibration motor in related technologies vibrates in a Z-axis direction, a plane in which the coil is located is set to be perpendicular to a vibration direction, and the coil is disposed around a magnetic steel of the vibration system. Because there is one coil, a magnetic field that emanates from a bottom portion of the magnetic steel is generally used to cut the coil to generate a Lorentz force to perform driving, and a magnetic field from a top portion of the magnetic steel is not used. As a result, a drive system generates a limited driving force. That is, a force factor BL is small, and the vibration performance of the linear vibration motor is affected.

Therefore, it is necessary to provide a new linear vibration motor to resolve the foregoing problem.

DETAILED DESCRIPTION

The present disclosure is further described below with reference to the accompanying drawings and implementations.

Figure 1:
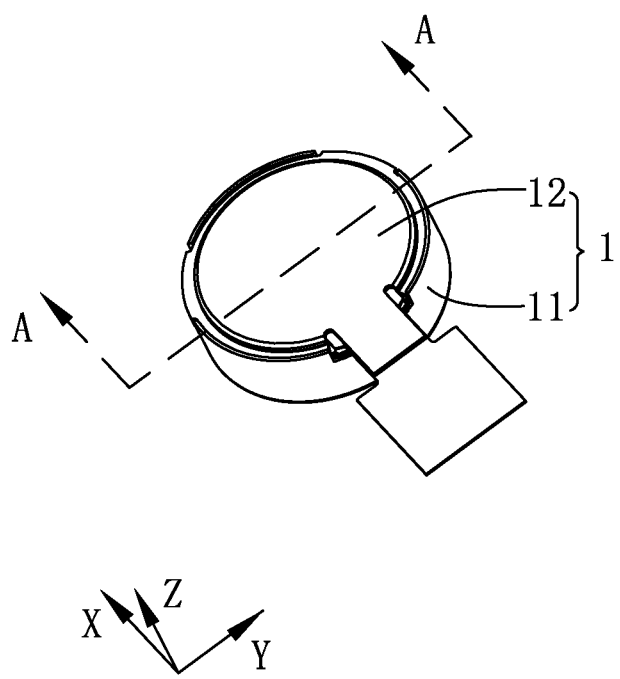
FIG. 1 is a schematic structural perspective view of a linear vibration motor according to the present disclosure.
Figure 2:
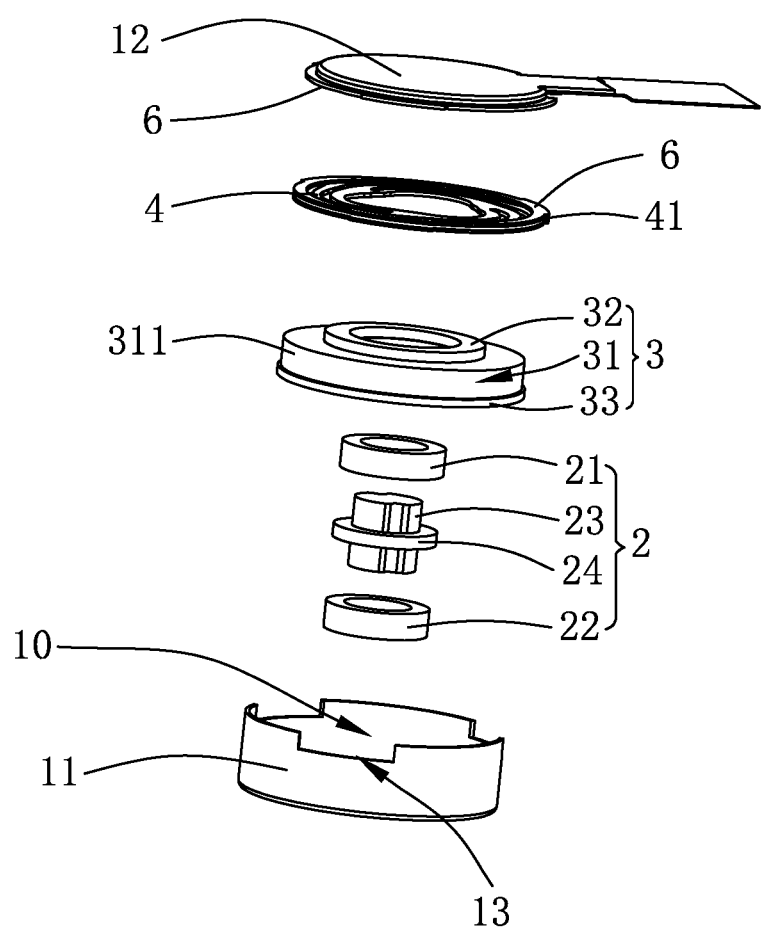
FIG. 2 is a partial schematic exploded structural view of a linear vibration motor according to the present disclosure.
Figure 3:
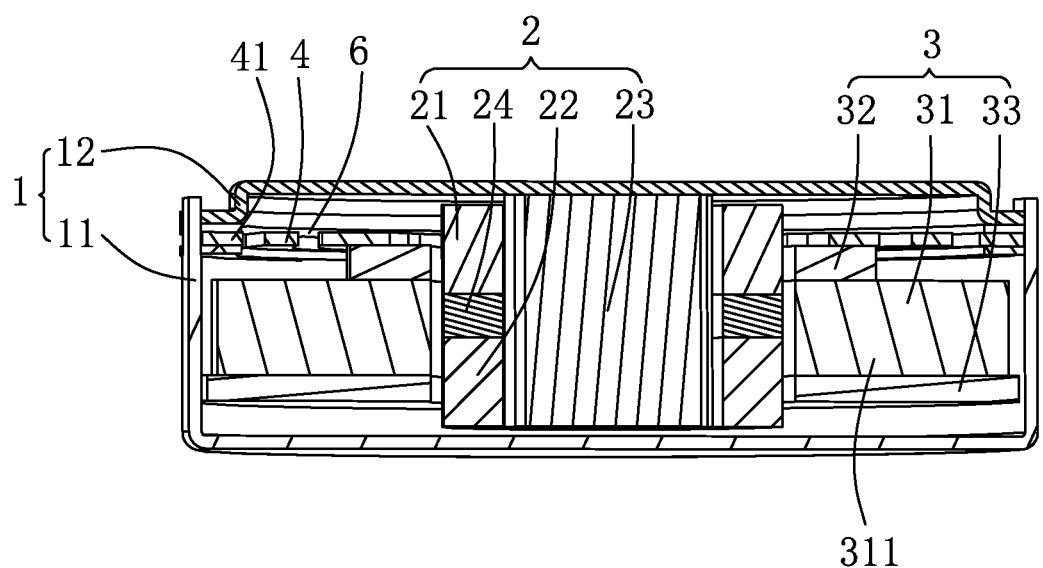
FIG. 3 is a schematic sectional view along a line A-A in FIG. 1.

Referring to FIG. 1 to FIG. 3 together, the present disclosure provides a linear vibration motor 100, including a base 1, a drive system 2, a vibration system 3, and an elastic member 4.

The base 1 includes a seat 11 and a cover plate 12 covering the seat 11. The seat 11 and the cover plate 12 enclose an accommodating space 10 together. The base 1 may be an integral structure or may be a separate structure. In this implementation, a groove 13 is provided in the base 1. For example, the groove 13 is disposed on an inner side of the seat 11.

The drive system 2 is fixed on the base 1, and is configured to drive the vibration system 3 to vibrate in a direction perpendicular to a horizontal direction, that is, perpendicular to a plane formed of X and Y axes in FIG. 1, so as to generate vibration in a Z-axis direction.

In this implementation, the drive system 2 includes a first coil 21 and a second coil 22 fixed on the base 1 and stacked together, and an iron core 23 fixed on the base 1.

The first coil 21 and the second coil 22 are respectively fixedly sleeved over the iron core 23 and are located between the iron core 23 and the vibration system 3.

The iron core 23 is fixed on the base 1, for example, fixed on the seat 11. The iron core 23 is disposed to improve a magnetic conduction effect of magnetic fields to increase a driving force of the drive system 2, so that the vibration system 3 has a better vibration effect.

A plane in which the first coil 21 and the second coil 22 are located is perpendicular to a vibration direction of the vibration system 3.

It should be noted that the first coil 21 and the second coil 22 may be disposed separately or abutted against each other in an insulated manner. Moreover, the first coil 21 and the second coil 22 may be two independent coils or a two-coil structure formed by winding a same coil wire. Both cases are feasible. In this implementation, the first coil 21 and the second coil 22 are formed by winding one coil wire.

In this implementation, the first coil 21 and the second coil 22 are disposed separately from each other, and a separation plate 24 is sandwiched between the first coil 21 and the second coil 22. The separation plate 24 is fixedly sleeved over the iron core 23. Specifically, current directions of the first coil 21 and the second coil 22 are opposite.

The vibration system 3 includes an annular magnetic steel unit 31 fixed on the elastic member 4, and a second pole 32 and a third pole core 33 respectively fixed on two opposite sides of the magnetic steel unit 31 in the vibration direction of the vibration system 3. That is, the second pole core 32 is fixed on a side, near the elastic member 4, of the magnetic steel unit 31, and the third pole core 33 is fixed on a side, far away from the elastic member 4, of the magnetic steel unit 31.

The magnetic steel unit 31 surrounds both the first coil 21 and the second coil 22 and is disposed separately from the first coil 21 and second coil 22. An orthogonal projection of the magnetic steel unit 31 in a direction towards the drive system 2 at least partially falls in the first coil 21 and the second coil 22, respectively. The structure is disposed to enable horizontally divided magnetism on an upper side and a lower side of the magnetic steel unit 31 to respectively pass through the first coil 21 and the second coil 22 to provide a Lorentz force, and the utilization of magnetic fields is high, so that a force factor BL is maximized, thereby effectively improving the vibration performance of the linear vibration motor 100.

After passing through the first coil 21, the magnetic fields pass the iron core 23, and leave the iron core 23 to pass through the second coil 22 again. Because the current directions of the first coil 21 and the second coil 22 are opposite, Lorentz forces generated by the first coil 21 and the second coil 22 are in the same direction, thereby significantly improving the vibration performance of the linear vibration motor 100.

The second pole core 32 and the third pole core 33 are respectively stacked in the two opposite sides of the magnetic steel unit 31 in the vibration direction of the vibration system 3, and are configured to conduct magnetism, thereby reducing a magnetic field loss of the magnetic steel unit 31.

Specifically, the magnetic steel unit 31 includes a first magnetic steel 311, and the first magnetic steel 311 magnetizes in the vibration direction. An orthogonal projection of the first magnetic steel 311 in a direction towards the drive system 2 at least partially falls in the first coil 21 and the second coil 22, respectively. In this case, the second pole core 32 and the third pole core 33 are respectively stacked in two opposite sides of the first magnetic steel 311 in the vibration direction of the vibration system 3.

The elastic member 4 fixes and suspends the vibration system 3 in the accommodating space 10, to facilitate the vibration of the vibration system 3. Specifically, the elastic member 4 is fixed on the second pole core 32, thereby implementing suspension of the vibration system 3.

In this implementation, the elastic member 4 has an annular structure, and is fixed on a side, near the cover plate 12, of the seat 11. Preferably, a protruding portion 41 fitting with the groove 13 is disposed on the elastic member 4, and the protruding portion 41 is engaged in the groove 13 for a fixed connection.

The linear vibration motor 100 further includes a baffle plate 6 at least attached to a side of the elastic member 4. The baffle plate 6 and the elastic member 4 are fixed to provide higher reliability during welding of the elastic member 4.

Figure 4:
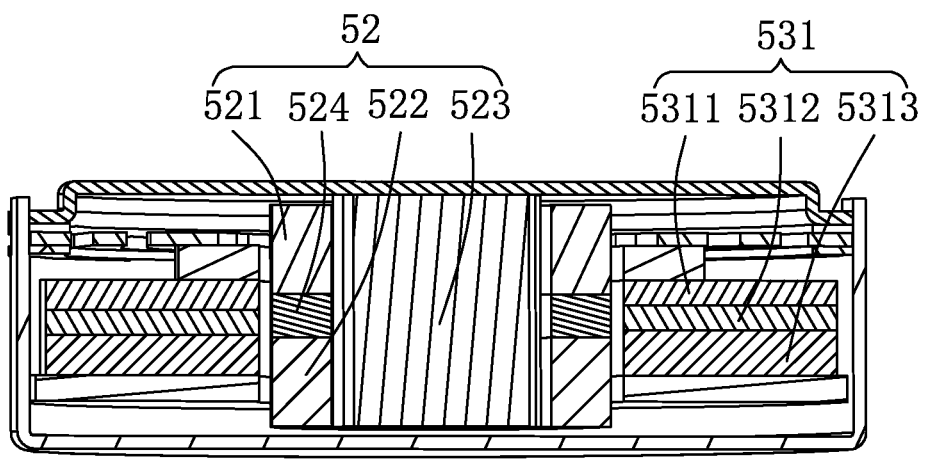
FIG. 4 is a partial schematic structural view of Embodiment 2 of a linear vibration motor according to the present disclosure.

Referring to FIG. 4, the linear vibration motor of the present disclosure further includes Embodiment 2. This implementation is basically the same as the foregoing implementation. Details are not described herein again. A difference lies in that the magnetic steel unit 31 has a different structure and current directions of the first coil 21 and the second coil 22 are the same. Details are as follows.

A magnetic steel unit 531 of the linear vibration motor 200 includes first magnetic steel 5311, a first pole core 5312, and second magnetic steel 5313 that are sequentially stacked. Both the first magnetic steel 5311 and the second magnetic steel 5313 magnetize in a vibration direction, and magnetization directions of the first magnetic steel 5311 and the second magnetic steel 5313 are opposite. An orthogonal projection of the first magnetic steel 5311 in a direction towards the drive system 52 at least partially falls in the first coil 521, and an orthogonal projection of the second magnetic steel 5313 in the direction towards the drive system 52 at least partially falls in the second coil 522, and current directions of the first coil 521 and the second coil 522 are the same.

The first magnetic steel 5311 and the second magnetic steel 5313 are vertically symmetrical, and magnetism is conducted by the first pole core 5312 and a separation plate 524 and then guided into an iron core 523, so as to form an upper magnetic circuit loop and a lower magnetic circuit loop with the first pole core 5312 being the centerline, thereby fully utilizing magnetic fields.

Compared with related technologies, the vibration system of the linear vibration motor of the present disclosure includes the annular magnetic steel unit fixed on the elastic member. The drive system includes the first coil and the second coil that are fixed on the base and stacked together. The orthogonal projection of the magnetic steel unit in the direction towards the drive system at least partially falls in the first coil and the second coil, respectively. The structure enables magnetic fields generated by an upper side and a lower side of the magnetic steel unit to pass through the first coil and the second coil, respectively, so as to fully use the magnetic fields to increase a force factor BL. The utilization of the magnetic fields is high, so that a Lorentz force is increased, thereby effectively improving the vibration performance of the linear vibration motor.

The foregoing descriptions are merely preferred embodiments of the present disclosure but are not intended to limit the patent scope of the present disclosure. Any equivalent modifications made to the structures or processes based on the content of the specification and the accompanying drawings of the present disclosure, or directly or indirectly use the content of the specification and the accompanying drawings of the present disclosure in other relevant technical fields shall also fall within the patent protection scope of the present disclosure.

What is claimed is:

1. A linear vibration motor, comprising: a base having an accommodating space, a vibration system accommodated in the accommodating space, an elastic member configured to fix and suspend the vibration system in the accommodating space, and a drive system fixed on the base and configured to drive the vibration system to vibrate in a direction perpendicular to a horizontal direction, wherein the vibration system comprises an annular magnetic steel unit fixed on the elastic member, the drive system comprises a first coil and a second coil that are fixed on the base and stacked together, the magnetic steel unit surrounds both the first coil and the second coil and is disposed separately from the first coil and second coil, and an orthogonal projection of the magnetic steel unit in a direction towards the drive system at least partially falls in the first coil and the second coil, respectively;

wherein the magnetic steel unit comprises a first magnetic steel, a first pole core, and a second magnetic steel that are sequentially stacked, both the first magnetic steel and the second magnetic steel magnetize in a vibration direction, magnetization directions of the first magnetic steel and the second magnetic steel are opposite, an orthogonal projection of the first magnetic steel in the direction towards the drive system at least partially falls in the first coil, an orthogonal projection of the second magnetic steel in the direction towards the drive system at least partially falls in the second coil, and current directions of the first coil and the second coil are the same.

2. The linear vibration motor according to claim 1, wherein the magnetic steel unit comprises a first magnetic steel, the first magnetic steel magnetizes in a vibration direction, an orthogonal projection of the first magnetic steel in the direction towards the drive system at least partially falls in the first coil and the second coil, respectively, and current directions of the first coil and the second coil are opposite.

3. The linear vibration motor according to claim 2, wherein the drive system further comprises an iron core fixed on the base, and the first coil and the second coil are fixedly sleeved over the iron core and are located between the iron core and the magnetic steel unit.

4. The linear vibration motor according to claim 3, wherein the drive system further comprises a separation plate fixedly sleeved over the iron core, and the separation plate is sandwiched between the first coil and the second coil.

5. The linear vibration motor according to claim 1, wherein the drive system further comprises an iron core fixed on the base, and the first coil and the second coil are fixedly sleeved over the iron core and are located between the iron core and the magnetic steel unit.

6. The linear vibration motor according to claim 5, wherein the drive system further comprises a separation plate fixedly sleeved over the iron core, and the separation plate is sandwiched between the first coil and the second coil.

7. The linear vibration motor according to claim 1, wherein the vibration system further comprises a second pole core fixed on a side, near the elastic member, of the magnetic steel unit, one end of the elastic member is fixed on the base, and the other end of the elastic member is fixed on the second pole core.

8. The linear vibration motor according to claim 1, wherein the vibration system further comprises a third pole core, fixed on a side, far away from the elastic member, of the magnetic steel unit.

9. The linear vibration motor according to claim 1, wherein the linear vibration motor further comprises a baffle plate at least attached to a side of the elastic member.

10. The linear vibration motor according to claim 1, wherein a groove is provided in the base, and the elastic member is provided with a protruding portion engaged in the groove.

11. The linear vibration motor according to claim 1, wherein the first coil and the second coil are formed by winding one coil wire.

* * * * *